US009834090B2

(12) United States Patent
McKinster et al.

(10) Patent No.: US 9,834,090 B2
(45) Date of Patent: Dec. 5, 2017

(54) FUEL TANK ASSEMBLY WITH TRIGGERED VENTING

(71) Applicant: Harley-Davidson Motor Company Group, LLC, Milwaukee, WI (US)

(72) Inventors: Scott Earl McKinster, Watertown, WI (US); Gerald Philip Buhle, Hartford, WI (US); Jeffrey Peter Myczek, Grafton, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 15/123,430

(22) PCT Filed: May 8, 2015

(86) PCT No.: PCT/US2015/029965
§ 371 (c)(1),
(2) Date: Sep. 2, 2016

(87) PCT Pub. No.: WO2015/172068
PCT Pub. Date: Nov. 12, 2015

(65) Prior Publication Data
US 2017/0174071 A1    Jun. 22, 2017

Related U.S. Application Data

(60) Provisional application No. 61/991,225, filed on May 9, 2014.

(51) Int. Cl.
*F16K 24/00*    (2006.01)
*B65D 41/04*    (2006.01)
(Continued)

(52) U.S. Cl.
CPC ........ *B60K 15/035* (2013.01); *B60K 15/0406* (2013.01); *B60K 2015/0359* (2013.01);
(Continued)

(58) Field of Classification Search
CPC ....... Y10T 137/86292; Y10T 137/8634; Y10T 137/6855; Y10T 137/6881;
(Continued)

(56) References Cited

U.S. PATENT DOCUMENTS 3,064,668 A * 11/1962 Alkire ................ B65D 51/1644
137/43
3,820,680 A *  6/1974 Friend .................... B65D 55/00
220/288

(Continued)

FOREIGN PATENT DOCUMENTS

EP          0838360      4/1998
JP          57147929     9/1982
(Continued)

OTHER PUBLICATIONS

International Search Report and Written Opinion for Application No. PCT/EP2015/029965 dated Oct. 13, 2015 (8 pages).

*Primary Examiner* — Seth W Mackay-Smith
(74) *Attorney, Agent, or Firm* — Michael Best & Friedrich LLP

(57) ABSTRACT

A fuel tank assembly includes a fuel tank including a fuel inlet. A fuel cap is threadably engageable with the fuel inlet. The fuel cap has a grip provided for manipulation by a user. A vent path extends between a vent channel and the interior of the fuel tank. In a first configuration, the fuel cap is fully threaded to the fuel inlet to a fully closed position. The assembly is operable to transition to a second configuration in which the vent path is unobstructed and the fuel cap is fully threaded to the fuel inlet to the fully closed position. To enable unthreading of the fuel cap from the fuel inlet, the fuel tank assembly is operable to transition from the first configuration to the second configuration in response to a movement that does not alter the threaded engagement with the fuel inlet.

17 Claims, 14 Drawing Sheets

(51) Int. Cl.
 *B60K 15/03* (2006.01)
 *B60K 15/04* (2006.01)
 *B60K 15/035* (2006.01)

(52) U.S. Cl.
 CPC ........... *B60K 2015/03538* (2013.01); *B60K 2015/03547* (2013.01); *B60K 2015/03585* (2013.01)

(58) Field of Classification Search
 CPC ........... Y10T 137/86348; B65D 41/06; B60K 15/0406; B60K 15/04; B60K 15/03; B60K 15/03006
 USPC ........... 220/86.2, 288, 293, 295, 367.1, 562
 See application file for complete search history.

(56) References Cited

U.S. PATENT DOCUMENTS

| | | | |
|---|---|---|---|
| 4,113,138 A * | 9/1978 | Fields | B60K 15/0406 220/360 |
| 4,189,059 A * | 2/1980 | Shaw | B60K 15/0406 220/246 |
| 4,294,376 A * | 10/1981 | Keller | B60K 15/0406 220/231 |
| 4,312,649 A * | 1/1982 | Fujii | B62J 35/00 137/38 |
| 4,676,390 A * | 6/1987 | Harris | B60K 15/0406 220/203.06 |
| 4,690,293 A | 9/1987 | Uranishi et al. | |
| 4,779,755 A * | 10/1988 | Harris | B60K 15/0406 220/203.04 |
| 4,795,050 A * | 1/1989 | Smith | B60K 15/03504 220/202 |
| 4,830,058 A * | 5/1989 | Harris | B60K 15/0406 138/89 |
| 4,928,657 A | 5/1990 | Asselin | |
| 5,000,339 A * | 3/1991 | Wheat | B60K 15/0409 220/202 |
| 5,029,722 A | 7/1991 | Bollinger et al. | |
| 5,108,001 A * | 4/1992 | Harris | B60K 15/0406 220/203.06 |
| 5,141,020 A * | 8/1992 | Sunderhaus | B60K 15/0406 137/467 |
| 5,183,173 A * | 2/1993 | Heckman | B60K 15/0406 220/203.07 |
| 5,207,463 A | 5/1993 | Seizert et al. | |
| 5,520,300 A * | 5/1996 | Griffin | B60K 15/0409 220/210 |
| 5,829,620 A | 11/1998 | Harris et al. | |
| 5,850,933 A | 12/1998 | Pazik | |
| 5,868,120 A | 2/1999 | Van Wetten et al. | |
| RE36,927 E * | 10/2000 | Griffin | B60K 15/0406 220/326 |
| RE36,959 E | 11/2000 | Griffin | |
| 6,176,260 B1 | 1/2001 | Hahner et al. | |
| 6,192,869 B1 | 2/2001 | Hahner et al. | |
| 6,209,745 B1 * | 4/2001 | Jansson | B60K 15/0406 220/288 |
| 6,286,704 B1 * | 9/2001 | Harris | B60K 15/0406 220/295 |
| 6,296,135 B1 * | 10/2001 | Anderson | B61D 17/16 105/377.05 |
| 6,533,288 B1 | 3/2003 | Brandner et al. | |
| 6,648,160 B2 * | 11/2003 | Hotch | B60K 15/0406 220/255 |
| 6,745,914 B2 * | 6/2004 | Hagano | B60K 15/0406 220/203.24 |
| 6,755,057 B2 | 6/2004 | Foltz | |
| 7,011,227 B2 * | 3/2006 | Ward | A47G 19/2272 220/254.3 |
| 7,278,547 B2 * | 10/2007 | Hagano | B60K 15/0406 215/301 |
| 7,353,808 B2 * | 4/2008 | Kakoo | F16K 31/20 123/516 |
| 7,690,525 B2 * | 4/2010 | Schutz | B65D 47/121 220/203.28 |
| 8,353,418 B2 * | 1/2013 | Bork | B65D 51/1683 220/203.01 |
| 8,887,696 B2 * | 11/2014 | Shimura | F02M 25/0836 123/519 |
| 2004/0021271 A1 | 2/2004 | Tratnik | |
| 2004/0099668 A1 * | 5/2004 | Reutter | F01P 11/0247 220/303 |
| 2005/0194796 A1 | 9/2005 | Powell | |
| 2006/0071003 A1 | 4/2006 | Miyauchi et al. | |
| 2006/0113309 A1 | 6/2006 | Zdroik et al. | |
| 2008/0000906 A1 * | 1/2008 | Nicosia | B62J 35/00 220/304 |
| 2008/0179325 A1 * | 7/2008 | Clarke | B60K 15/0406 220/202 |
| 2010/0051621 A1 | 3/2010 | Shimoda et al. | |
| 2010/0089919 A1 * | 4/2010 | Dunkle | B60K 15/0406 220/203.01 |
| 2011/0168715 A1 | 7/2011 | Erdmann et al. | |
| 2012/0240904 A1 | 9/2012 | Shimura et al. | |
| 2013/0014730 A1 | 1/2013 | Shimura et al. | |
| 2013/0193150 A1 | 8/2013 | Keefer et al. | |
| 2013/0206775 A1 | 8/2013 | Heidemeyer et al. | |

FOREIGN PATENT DOCUMENTS

| | | |
|---|---|---|
| JP | 2010084655 | 4/2010 |
| JP | 2013119340 | 6/2013 |

* cited by examiner

FUEL TANK ASSEMBLY WITH TRIGGERED VENTING

CROSS-REFERENCE TO RELATED APPLICATIONS

This application claims priority to U.S. Provisional Patent Application No. 61/991,225, filed on May 9, 2014, the entire contents of which are incorporated herein by reference.

FIELD OF THE INVENTION

The present invention relates to fuel system components for vehicles. In particular, the invention relates to fuel caps and fuel cap covers, and the manner in which the fuel caps and fuel cap covers are arranged and assembled within a fuel tank. In some aspects, the invention may relate to vehicles with exposed fuel tanks, such as motorcycles.

BACKGROUND OF THE INVENTION

Engines which run on fuels such as gasoline or diesel fuel typically include a tank which stores the fuel that has not yet been utilized by the engine. These fuel tanks include openings through which a user can refuel when the level of fuel within the tank decreases. When not opened for refueling, the opening is covered by a fuel cap which seals the fuel tank. When the fuel cap is secured to the tank, the fuel tank may be vented. Proper venting of fuel tanks in cars or vehicles is important to reduce emissions of hydrocarbon fuels into the atmosphere and thus to reduce pollution of the atmosphere.

SUMMARY OF THE INVENTION

The invention provides, in one aspect, a fuel tank assembly. The fuel tank assembly includes a fuel tank including a fuel inlet providing access to an interior of the fuel tank. A fuel cap is threadably engageable with the fuel inlet to selectively close the fuel inlet. The fuel cap has a grip portion provided for manipulation by a user. A vent path extends between a vent channel and the interior of the fuel tank. In a first configuration of the fuel tank assembly, the fuel cap is fully threaded to the fuel inlet to a fully closed position. The fuel tank assembly is operable to transition to a second configuration in which the vent path is unobstructed regardless of the pressure inside the fuel tank and the fuel cap is fully threaded to the fuel inlet to the fully closed position. To enable unthreading of the fuel cap from the fuel inlet, the fuel tank assembly is operable to transition from the first configuration to the second configuration in response to opening of a fuel door to uncover the grip portion or a movement of the grip portion that does not alter the threaded engagement with the fuel inlet.

The invention provides, in another aspect, a fuel cap for selectively sealing a fuel inlet of a fuel tank. The fuel cap includes a body portion engageable with the fuel inlet. A movable portion includes a grip portion, is coupled to the body portion, and is movable relative to the body portion between a retracted position in which the grip portion is stowed to inhibit manipulation and an extended position in which the grip portion is presented for manipulation. A valve assembly is operable to selectively establish a vent path in response to movement of the movable portion from the retracted position to the extended position.

The invention provides, in yet another aspect, a fuel cap for selectively sealing a fuel inlet of a fuel tank. The fuel cap includes a first body portion with threads engageable with the fuel inlet. A second body portion defines a grip portion, the second body portion being rotatable relative to the first body portion by exterior manipulation of the grip portion. A valve assembly is operable to selectively establish a vent path to vent a pressure differential between interior and exterior sides of the fuel cap. In a first configuration, the vent path is blocked and a driving engagement is provided for driving the first body portion by the second body portion in a closing direction. In a second configuration, the vent path is established and a driving engagement is provided for driving the first body portion by the second body portion in an opening direction.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
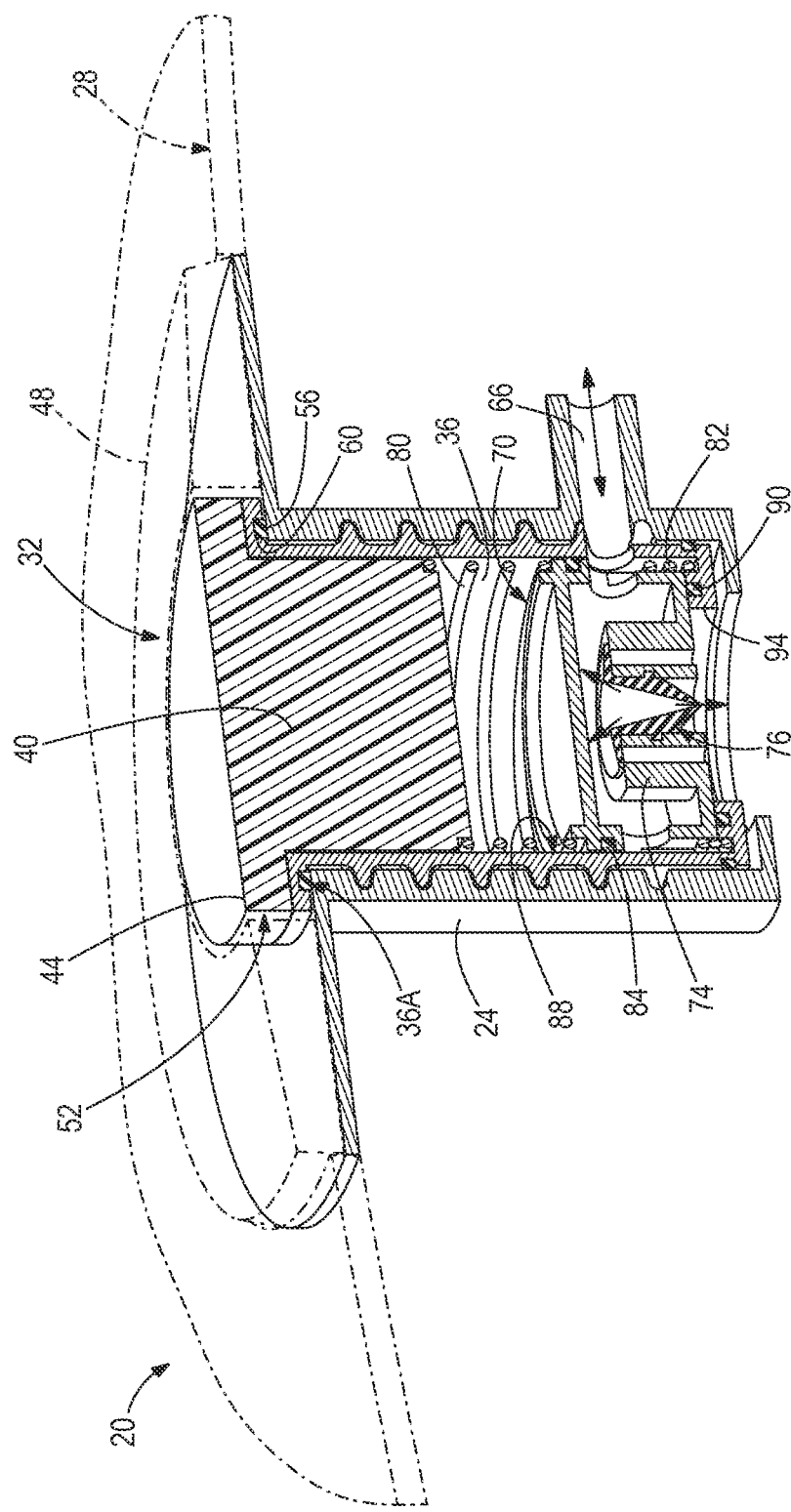
FIG. 1 is a cross-section view of a fuel tank assembly, according to one embodiment of the invention, including a fuel cap shown in a closed position and secured to a fuel tank.
Figure 2:
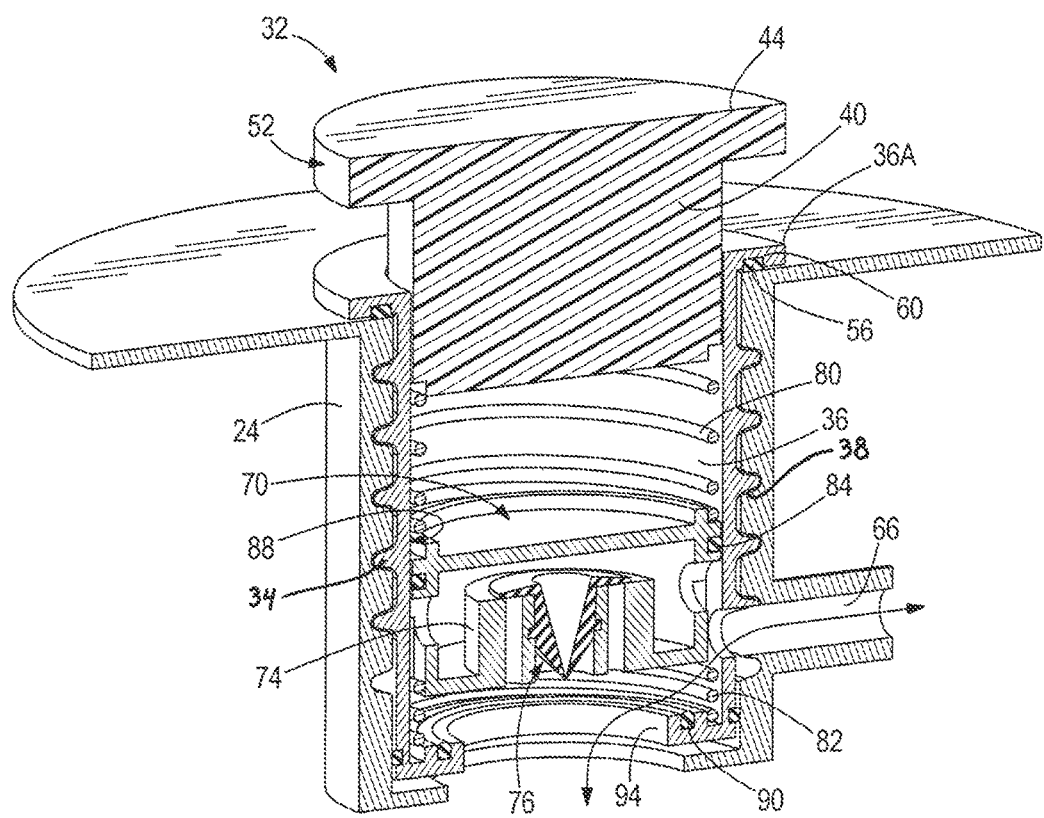
FIG. 2 is a cross-section view of the fuel tank assembly of FIG. 1, the fuel cap shown in an extended, but closed configuration.
Figure 3:
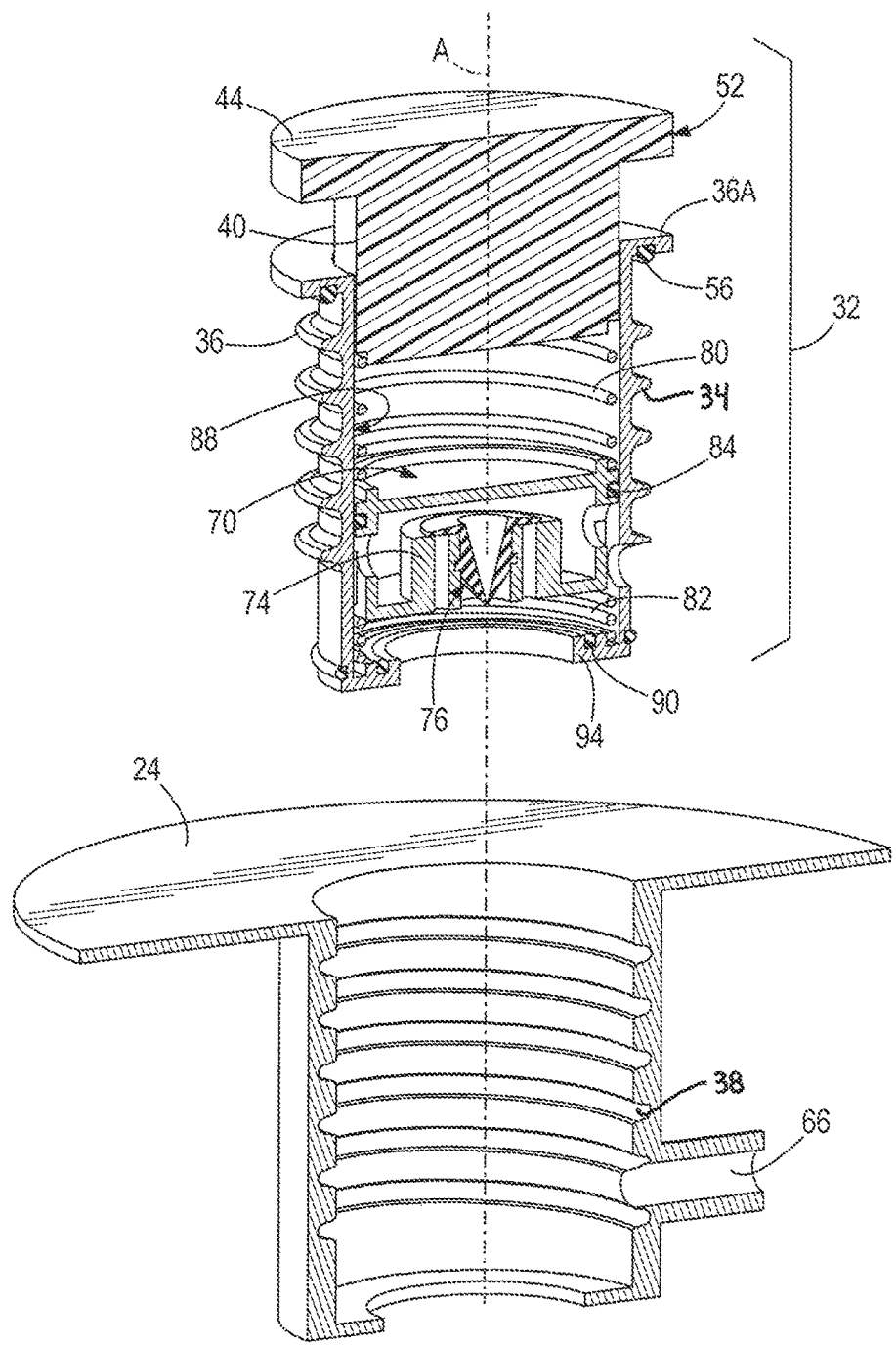
FIG. 3 is a cross-section view of the fuel tank assembly of FIG. 1, the fuel cap shown disengaged from the fuel tank.

FIGS. 1-3 illustrate a fuel tank assembly including a fuel tank 20 and a fuel cap 32. The fuel tank 20 may be provided on a vehicle such as a motorcycle to contain a quantity of fuel for supply to an engine (e.g., a gasoline-fueled internal combustion engine) which provides motive power to the vehicle during operation. The fuel tank 20 includes a fuel inlet 24 along an upper surface 28 of the fuel tank 20, and the inlet 24 can be selectively opened or closed with the fuel cap 32. When the fuel inlet 24 is closed by the fuel cap 32, the fuel cap 32 is fully threaded to the inlet 24 such that the fuel cap seals the opening to prevent fuel return from inside the fuel tank 20, through the inlet 24, and to the atmosphere. For example, the fuel cap 32 can seal in the contents of the fuel tank 20 during operation, and when the operator needs to refuel, the fuel cap 32 is removed to access the fuel tank 20 for adding fuel through the fuel inlet 24. The fuel cap 32 illustrated in FIGS. 1-3 is a flush-mount type of fuel cap having features common to that disclosed in U.S. Patent Application Publication No. 2008/0000906, the entire contents of which are incorporated by reference herein.

The flush-mount fuel cap 32 is provided with a body portion 36 for engaging the fuel inlet 24 and is further provided with a movable or retractable portion 40 coupled to the body portion 36 and movable relative to the body portion 36 along the central axis A (FIG. 3), and a cap cover 44 or grip coupled to or integral with the retractable portion 40 and movable with the retractable portion 40 relative to the body portion 36. To achieve the flush mounting with the surrounding fuel tank 20 (i.e., the tank upper surface 28 or a bezel 48 secured to the tank upper surface), the cap cover 44 and the retractable portion 40 are axially movable between a retracted position (FIG. 1) or first configuration in which a vent path is obstructed regardless of the pressure inside the fuel tank, and in which an upper surface of the cap cover 44 generally follows the contour of the surrounding fuel tank 20 (i.e., the tank upper surface 28 or the bezel 48), and an extended position (FIG. 2) or second configuration in which a vent path is unobstructed regardless of the pressure inside the fuel tank, and in which the cap cover 44 is positioned to extend above the immediately surrounding portion of the fuel tank 20. The retracted position of FIG. 1 conceals an outer cylindrical gripping surface 52 of the cap cover 44, while the extended position of FIG. 2 exposes the outer cylindrical gripping surface 52 for manipulation by the hand of the operator. Moving the cap cover 44 between the extended and retracted positions can be accomplished by depressing and twisting the cap cover 44 relative to the body portion 36 as described in U.S. Patent Application Publication No. 2008/0000906, and the mechanism may be similar to that disclosed therein, although other variations may be provided. Movement of the cap cover 44 between the extended and retracted positions has no effect on whether the fuel inlet 24 is accessible, since the body portion 36 remains sealed to the fuel inlet 24 until unscrewed.

With reference to FIG. 2, the body portion 36 includes external threads 34 configured to engage corresponding internal threads 38 in the fuel inlet 24. An O-ring 56 is positioned in a circumferential groove 60 formed near an upper end 36A of the body portion 36 to provide a seal between the body portion 36 and the fuel inlet 24 when the fuel cap 32 is threaded into the fuel inlet 24. Alternatively, other types of resilient seals may be utilized in place of the O-ring 56 to seal the fuel cap 32 to the fuel inlet 24. Thus, when the fuel cap 32 is screwed into the fuel inlet 24, neither fuel nor fuel vapor can escape to the atmosphere between the fuel inlet 24 and the fuel cap 32. However, pressure management of the fuel tank 20 may be accomplished via one or more valves while the fuel cap 32 is sealed to the fuel inlet 24.

As shown in FIGS. 1-3, the fuel inlet 24 includes a vent channel 66 which is open to an interior of the body portion 36. The vent channel 66 may be fluidly coupled to a device such as a carbon canister (not shown) for trapping fuel vapor to reduce evaporative emissions. In other configurations or constructions, the vent channel 66 can direct fuel vapor into the vehicle engine or to the atmosphere. A valve assembly 70 is provided within the body portion 36 to control the inward and/or outward pressure venting of the interior of the fuel tank 20. The valve assembly 70 includes a valve body 74. The valve body 74 may include one or more apertures and may support one or more valve members 76 operable to seal in one pressure direction and selectively open in the opposite pressure direction, at a predetermined pressure differential. The valve members 76 can take any number of physical forms including, but not limited to, umbrella valves, duckbill valves, combination umbrella/duckbill valves, and spring valves. Further, the valve members 76 may include one-way valves (capable of venting in one direction) or may include two-way valves (capable of venting in both directions). The valving within the valve body 74 can provide venting of excess internal pressure (of air and/or fuel vapor) above a predetermined internal pressure (e.g., 2.5 psig) from the fuel tank 20 to the vent channel 66 and can also provide for make-up air to enter the fuel tank 20 when vacuum above a predetermined level (e.g., 0.5 psig) is present in the fuel tank 20. The make-up air may include fuel vapor from the carbon canister. The valving within the valve body 74 operates to mitigate pressure or vacuum build-up in the fuel tank 20 at all times while the fuel cap 32 is sealed to the fuel inlet 24. For example, excess pressure is relieved during periods of warming within the fuel tank 20 (with the engine running or stopped) and excess vacuum pressure is relieved during periods of cooling within the fuel tank 20. The valving arrangement will facilitate a temporary venting passage upon reaching either of the set pressures (positive or negative) and will close the venting passage upon the pressure differential decreasing to a closing pressure, which may be nearly equal to the given set pressure. However, there is an additional function for venting the fuel tank 20 immediately prior to removal of the fuel cap 32 from the fuel inlet 24, regardless of the operational state(s) of the valving within the valve body 74. The valve body 74 itself forms a movable valve element, movable within the cap body portion 36 to selectively establish fluid communication between the interior of the fuel tank 20 and the vent channel 66.

The valve body 74 is suspended between an upper spring 80 and a lower spring 82. The upper spring 80 applies a greater spring force than the lower spring 82 when the fuel cap 32 is fully closed with the movable portion 40 in the retracted position. Relative to the lower spring 82, the upper spring 80 is located nearer the cap cover 44 or the exterior of the fuel tank 20 when the fuel cap 32 is installed. A first seal 84 is provided between the valve body 74 and the interior cylindrical wall 88 of the cap body portion 36, above the vent channel 66, as shown in FIGS. 1-3. A second seal 90 is provided between the valve body 74 and a bottom wall 94 of the cap body portion 36, below the vent channel 66. When the fuel cap 32 is fully closed with the movable portion 40 in the retracted position as shown in FIG. 1, the upper spring 80 keeps the second seal 90 closed so that fluid communication is blocked between the fuel tank 20 and the vent channel 66. However, when the movable portion 40 is extended as shown in FIG. 2, the pressure of the upper spring 80 on the valve body 74 is at least partially relieved and the lower spring 82 moves the valve body 74 to break the second seal 90. In this position, fluid communication is established between the fuel tank 20 and the vent channel 66. The first seal 84 remains closed to prevent fuel vapor from escaping outward between the body portion 36 and the movable portion 40 of the fuel cap 32. Thus, at the time that the operator releases the movable portion 40 to the extended position, a vent passage that bypasses the normal passage through the valve assembly 70 is established for venting positive or vacuum pressure within the tank 20, regardless of the magnitude of the pressure. In other words, the valve body 74 is operable to vent the fuel tank 20 in response to the fuel cap 32 being moved from a flush or retracted position (in which the cap is not graspable for unscrewing) to a non-flush or extended position (in which the cap is graspable for unscrewing). Forced venting responsive to the extension of the movable member 40 and cap cover 44 ensures that the fuel tank 20 is always vented immediately prior to removal of the fuel cap 32 from the fuel inlet 24 (FIG. 3), which limits unregulated pressure equalization through the fuel inlet 24 when the fuel cap 32 is unscrewed.

FIGS. 4-7 illustrate fuel tank assembly including a fuel tank 120 and a flush mount fuel cap 132 according to another embodiment. The fuel cap 132 is provided with a body portion 136 for engaging the fuel inlet 124 of the fuel tank 120 and is further provided with a movable or retractable portion 140 coupled to the body portion 136 and movable relative to the body portion 136 along the central axis B, and a cap cover 144 or grip coupled to or integral with the retractable portion 140 and movable with the retractable portion 140 relative to the body portion 136. To achieve the flush mounting with the surrounding fuel tank 120 (i.e., the tank upper surface 128 or a bezel 148 secured to the tank upper surface), the cap cover 144 and the retractable portion 140 are axially movable between a retracted position (FIG. 5) or first configuration, in which an upper surface of the cap cover 144 generally follows the contour of the surrounding fuel tank 120 (i.e., the tank upper surface 128 or the bezel 148), and an extended position (FIG. 4) or second configuration in which a vent path is obstructed regardless of the pressure inside the fuel tank, and in which the cap cover 144 is positioned above the immediately surrounding portion of the fuel tank 120. The retracted position of FIG. 5 conceals an outer cylindrical gripping surface 152 of the cap cover 144, while the extended position of FIG. 4 exposes the outer cylindrical gripping surface 152 for manipulation by the hand of the operator. Moving the cap cover 144 between the extended and retracted positions can be accomplished by depressing and twisting the cap cover 144 relative to the body portion 136. Movement of the cap cover 144 between the extended and retracted positions has no effect on whether the fuel inlet 124 is accessible, since the body portion 136 remains sealed to the fuel inlet 124 until unscrewed.

Figure 4:
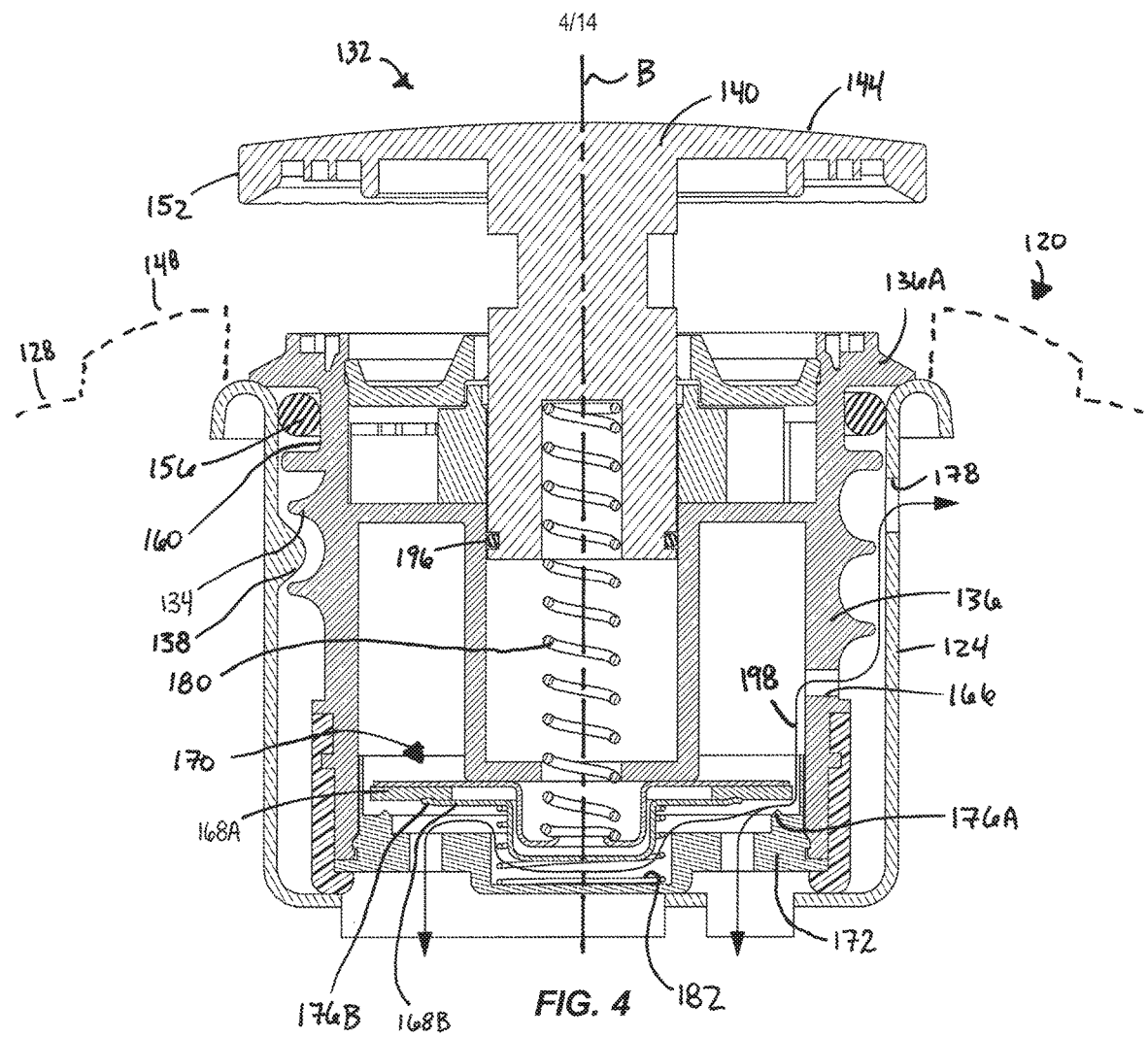
FIG. 4 is a cross-section view of a fuel tank assembly, according to another embodiment, including a fuel cap shown in an extended, but closed configuration.

With reference to FIG. 4, the body portion 136 includes external threads 134 configured to engage one or more corresponding internal threads 138 in the fuel inlet 124. An O-ring 156 is positioned in a circumferential groove 160 formed near an upper end 136A of the body portion 136 to provide a seal between the body portion 136 and the fuel inlet 124 when the fuel cap 132 is threaded into the fuel inlet 124. Alternatively, other types of resilient seals may be utilized in place of the O-ring 156 to seal the fuel cap 132 to the fuel inlet 124. Thus, when the fuel cap 132 is screwed into the fuel inlet 124, neither fuel nor fuel vapor can escape to the atmosphere between the fuel inlet 124 and the fuel cap 132. However, pressure management of the fuel tank 120 may be accomplished via one or more valves while the fuel cap 132 is sealed to the fuel inlet 124.

As shown in FIGS. 4-7, the body portion 136 includes a vent channel 166 which opens to an interior of the body portion 136. The vent channel 166 may be fluidly coupled to a device such as a carbon canister (not shown) via a secondary vent channel 178 in the fuel inlet 124 for trapping fuel vapor to reduce evaporative emissions. In other configurations or constructions, the vent channel 166 can direct fuel vapor into the vehicle engine or to the atmosphere. A valve assembly 170 is provided within the body portion 136 to control the inward and/or outward pressure venting of the interior of the fuel tank 120. As illustrated, the valve assembly 170 includes a two valve members 168A, 168B normally biased against a stationary body 172 of the valve assembly 170 provided with a raised circumferential rib for selectively establishing a first seal 176A with the first valve member 168A. In other constructions, the valve assembly can include valve members of any number of physical forms including, but not limited to, umbrella valves, duckbill valves, combination umbrella/duckbill valves, and spring valves. Further, the valve members 168A, 168B may include one-way valves (capable of venting in one direction) or may include two-way valves (capable of venting in both directions). The make-up air may include fuel vapor from the carbon canister. The valving within the valve assembly 170 can provide venting of excess pressure (of air and/or fuel vapor) above a predetermined internal pressure (e.g., 2.5 psig) from the fuel tank 120 to the vent channel 166, as shown by arrow 162 (FIG. 5), where at least a portion of both valve members 168A, 168B are moved relative to the stationary body 172 of the valve assembly 170 to break the first seal 176A. The valving can also provide for make-up air to enter the fuel tank 120 when vacuum above a predetermined level (e.g., 0.5 psig) is present in the fuel tank 120, as shown by arrow 164 (FIG. 5), where at least a portion of the second valve member 168B is displaced away from the first valve member 168A to break the second seal 176B. The valving within the valve assembly 170 operates to mitigate pressure or vacuum build-up in the fuel tank 120 at all times while the fuel cap 132 is sealed to the fuel inlet 124, similar to the valving within valve body 74 (FIGS. 1-3). Likewise, there is an additional function for venting the fuel tank 120 immediately prior to removal of the fuel cap 132 from the fuel inlet 124, regardless of the operational state(s) of the valve assembly 170. The valve members 168A, 168B form a movable valve element, movable within the cap body portion 136 to selectively establish fluid communication between the interior of the fuel tank 120 and the vent channel 166.

Figure 5:
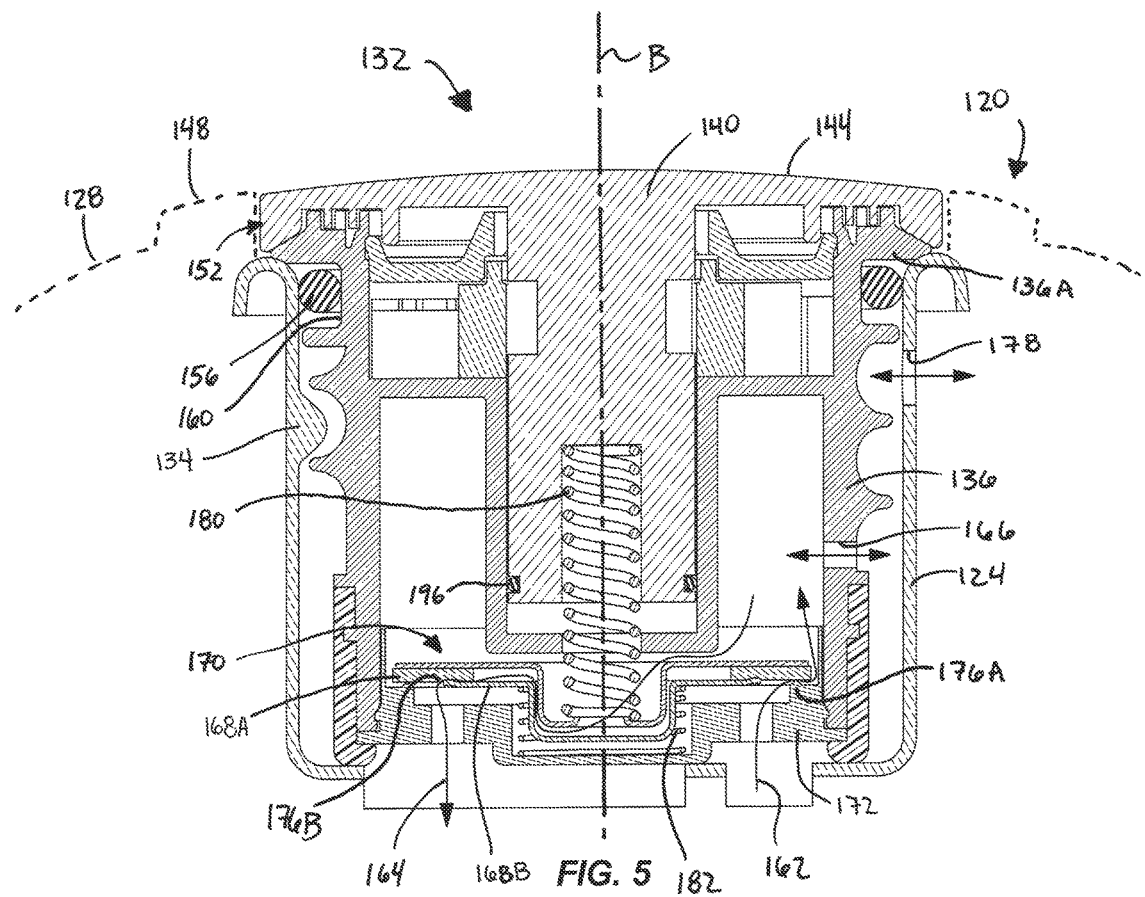
FIG. 5 is a cross-section view of the fuel tank assembly of FIG. 4, the fuel cap shown in a retracted configuration and secured to a fuel tank.
Figure 6:
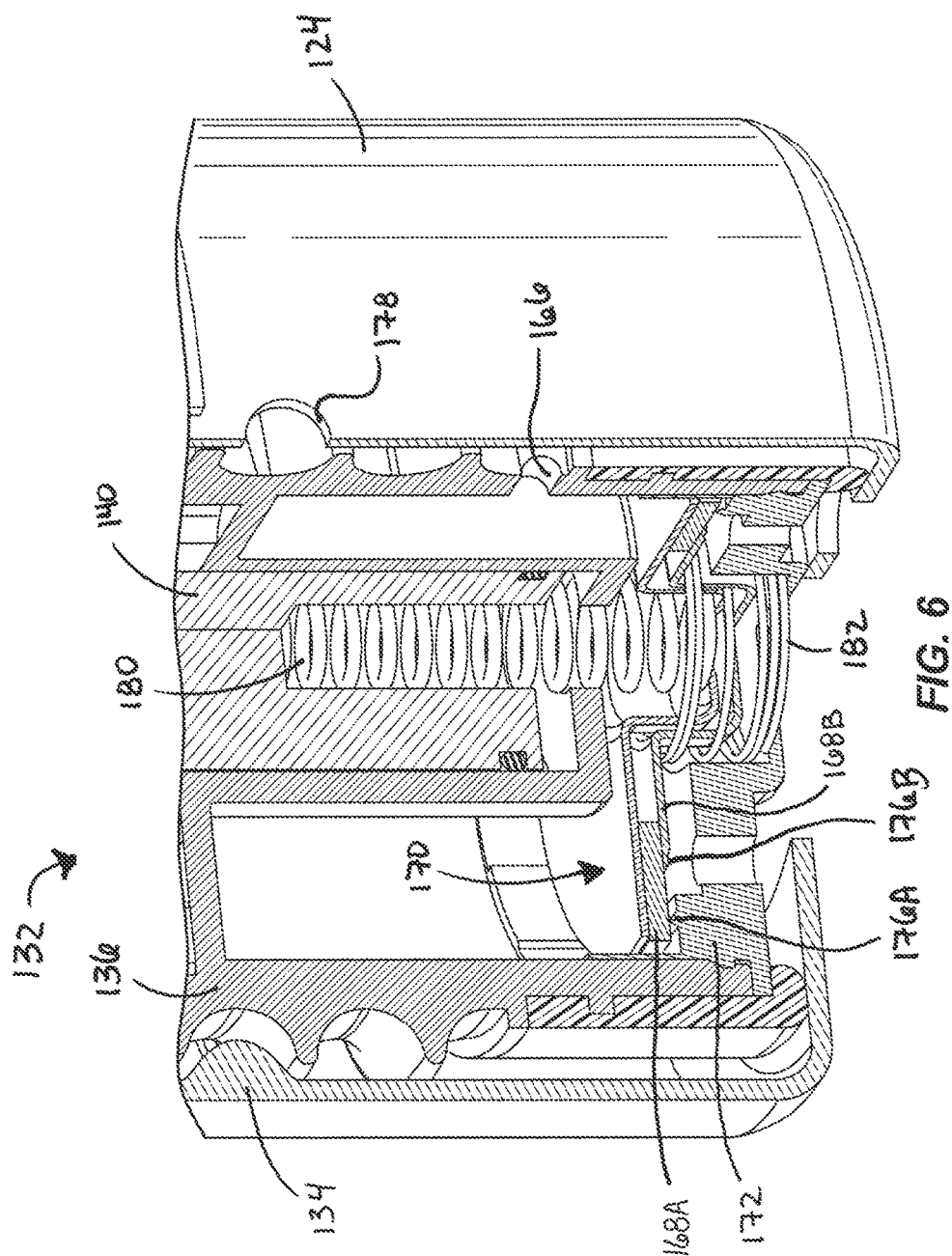
FIG. 6 is a partial cross-section perspective view of the fuel tank assembly of FIG. 4 including a valve assembly.
Figure 7:
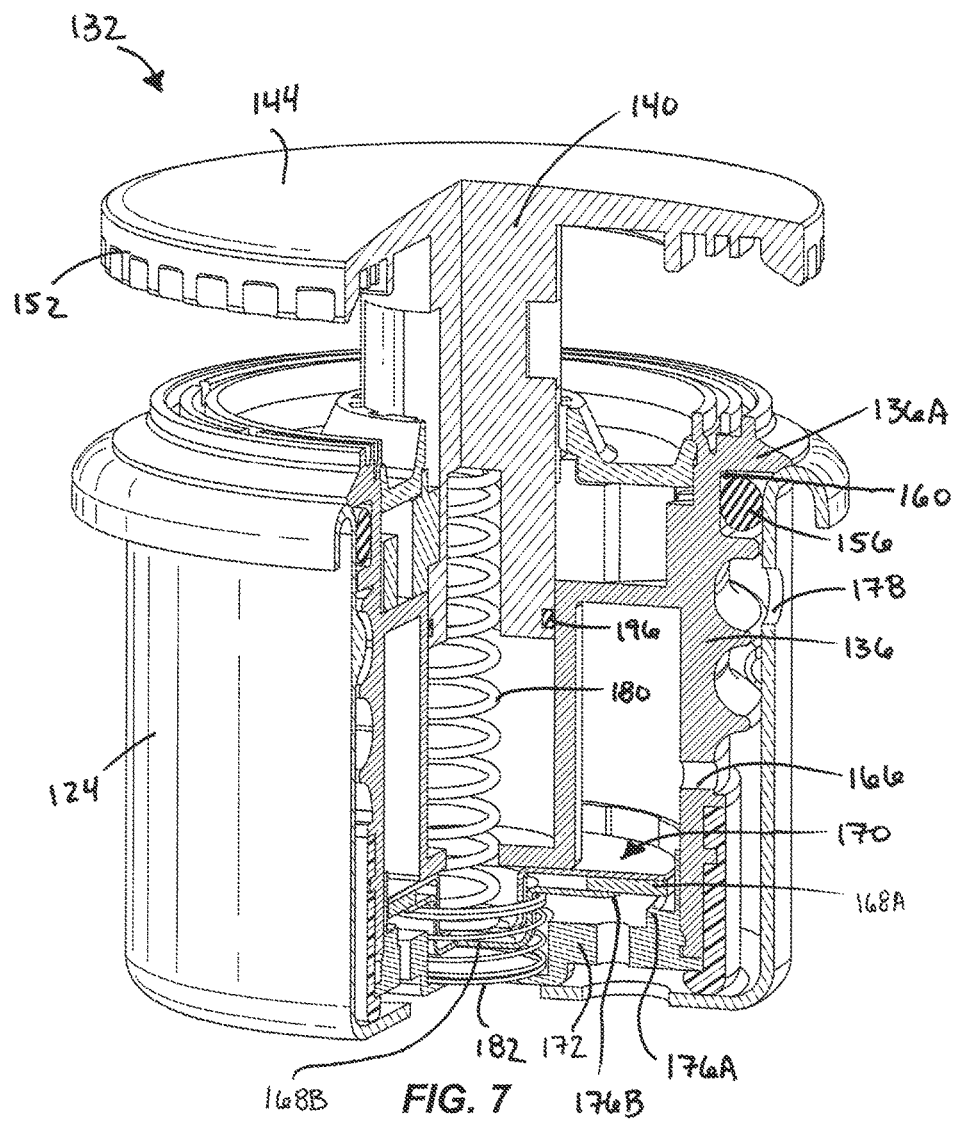
FIG. 7 is a partial cross-section perspective view of the fuel tank assembly of FIG. 4.

The movable valve members 168A, 168B are suspended between and biased together by an upper spring 180 and a lower spring 182. The upper spring 180 applies a greater spring force than the lower spring 182 when the fuel cap 132 is fully closed with the movable portion 140 in the retracted position. Relative to the lower spring 182, the upper spring 180 is located nearer the fuel cap cover 144 or the exterior of the fuel tank 120 when the fuel cap 132 is installed. The first valve member 168A creates a first seal 176A, provided between the valve assembly 170 and the cap body portion 136. The second valve member 168B creates a second seal 176B between components of the valve assembly 170. When the fuel cap 132 is fully closed with the movable portion 140 in the retracted position as shown in FIG. 5, the upper spring 180 keeps the first and second seals 176A, 176B closed so that fluid communication is blocked between the fuel tank 120 and the vent channel 166. However, when the movable portion 140 is extended as shown in FIG. 4, the pressure of the upper spring 180 on the valve assembly 170 is at least partially relieved and the lower spring 182 moves the valve assembly 170 to break the first seal 176A. In this position, fluid communication is established between the fuel tank 120 and the vent channel 166. Thus, at the time that the operator releases the movable portion 140 to the extended position, a passage past the first valve member 168A is established for venting positive or vacuum pressure within the tank 120, as shown by arrow 198 (FIG. 4), regardless of the magnitude of the pressure. In other words, the valve assembly 170 is operable to vent the fuel tank 120 in response to the fuel cap 132 being moved from a flush or retracted position (in which the cap is not graspable for unscrewing) to a non-flush or extended position (in which the cap is graspable for unscrewing). Forced venting responsive to the extension of the movable member 140 and cap cover 144 ensures that the fuel tank 120 is always vented immediately prior to removal of the fuel cap 132 from the fuel inlet 124, which limits unregulated pressure equalization through the fuel inlet 124 when the fuel cap 132 is unscrewed. An additional seal created by an O-ring 196 located between the movable portion 140 and the body portion 136 remains closed to prevent fuel vapor from escaping outward between the body portion 136 and the movable portion 140 of the fuel cap 132.

Figure 8:
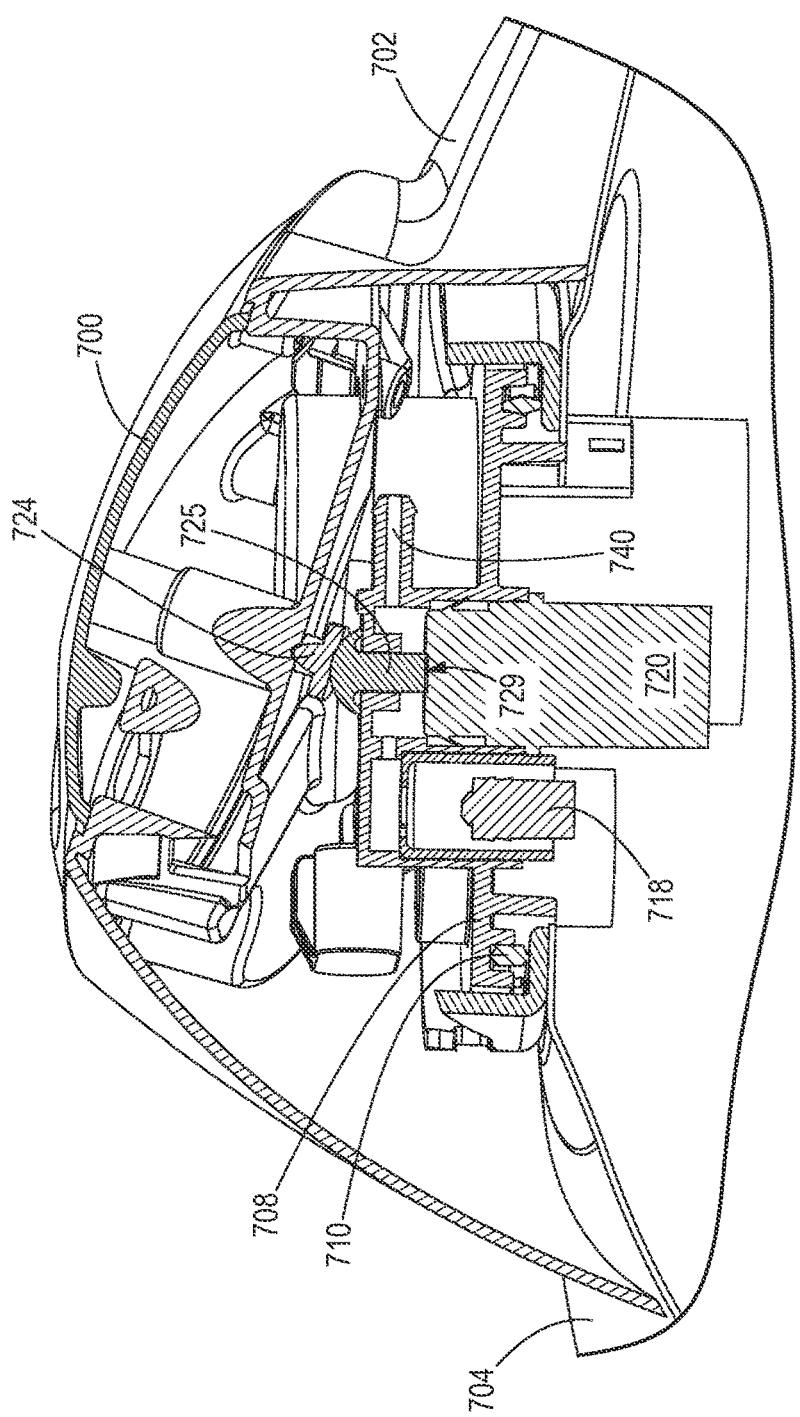
FIG. 8 is a cross-section view of a fuel tank assembly according to another embodiment having a pressure release cap that is covered by a fuel door in a closed position.
Figure 9:
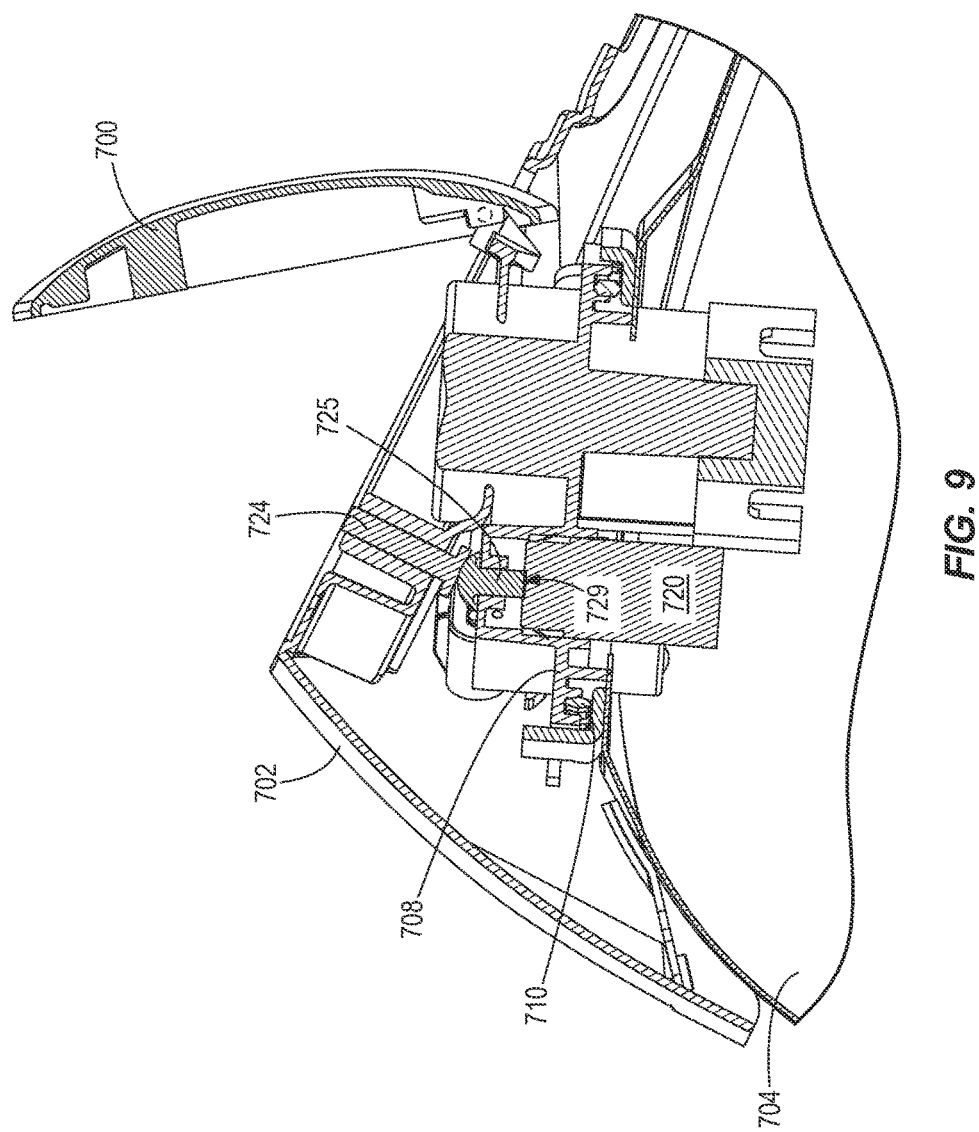
FIG. 9 is a cross-section view of the fuel tank assembly of FIG. 8, showing the fuel door in an open position.

FIGS. 8 and 9 illustrate a fuel tank assembly including a fuel tank 704 and a fuel door-actuated pressure control and release arrangement. In some cases, the fuel tank 704 may be a motorcycle fuel tank having a central fuel inlet structure with a fuel door 700 that covers a fuel inlet to the fuel tank 704. The arrangement provides automatic pressure release, protection against liquid fuel release should the vehicle be upended (roll over protection), and controlled release of pressure prior to removal of the fuel cap for vehicle refueling or other reasons.

As shown in FIG. 8, the fuel door 700 is held in the closed position by a latching mechanism (not shown). The fuel door 700 is supported for movement on a console 702, which is in turn secured to the exterior of the fuel tank 704. A large opening in the top of the fuel tank 704 is sealed by a top plate 708 and top plate seal 710. The top plate 708 defines a smaller opening configured to receive a fuel cap (not shown) for selectively providing access to the inside of the fuel tank 704. The top plate 708 is constructed in such a way that a pressure control valve 718 and roll over/pressure release valve 720 may be incorporated therein. The pressure control valve 718 and the pressure relief valve 720 may be discrete modules inserted into mountings, or may be integral depending on various design decisions. In some constructions, the top plate 708 may also support a fuel pump module and fuel filter positioned adjacent a bottom surface of the fuel tank interior.

The pressure control valve 718 seals the fuel tank 304 to hold in positive pressure until a set pressure is achieved at which point it will open to bleed off pressure in excess of the set pressure. The pressure control valve 718 can alternately or additionally provided a vacuum valve that allows air/fuel vapor to return to the fuel tank 704 if the pressure inside the fuel tank 704 drops below the barometric pressure by a predetermined amount. Further, an actuation linkage, represented in the illustrated construction by a fuel door button 724 and a pressure actuator 725, transfers force from the fuel door 700 to a valve seat 729. One possible configuration of the actuation linkage is shown, but multiple designs are possible. Regardless of the particular mechanical arrangement or motion type, movement to close the fuel door 700 causes the valve seat 729 to be sealed. In this condition, the pressure release function of the rollover/pressure release valve 720 is effectively disabled.

In the closed position, or first configuration, any pressure that builds inside the fuel tank 704 from changes in atmospheric conditions (temperature increase, barometric pressure drop) is contained inside the fuel tank 704 until that pressure increases above the set pressure of the pressure control valve 718. At that point, excess air and fuel vapor exit the fuel tank 704 through the pressure control valve 718 and are conducted through the vent 740 and venting tubes (not shown) to the atmosphere or a carbon canister, depending on the configuration of the vehicle in those areas.

In the open position of the fuel door 700, or second configuration, shown in FIG. 9, the latching mechanism (not shown) that holds the fuel door 700 closed is released and the fuel door 700 is rotated to provide access to the top plate 708, through which fuel may be added after removal of the fuel cap (e.g., unthreading the fuel cap from the opening within the top plate 708). When the fuel door 700 is opened, the force previously applied to the pressure actuator 725 and the valve seat 729 from the fuel door 700 (e.g., through the fuel door button 724) is removed, allowing the valve seat 729 to open and the pressure inside the fuel tank 704 to equalize with barometric pressure by air/fuel vapor flow through vent 740 and vent lines (not shown). At this time, any tank pressure above or below ambient is relieved, without any action or operation of the pressure control valve 718.

The rollover feature of rollover/pressure release valve 720 becomes active should the vehicle fall onto its side when the fuel door 700 is in the open position. Finally, the rollover/pressure release valve 720 becomes important should the fuel door 700 and/or actuation linkage (fuel door button 724, pressure actuator 725) or their mountings become damaged as is possible during, for instance, a vehicle accident. In that event, the rollover/pressure release valve 720 will provide protection from liquid fuel escape from the fuel tank 704 should the vehicle be, for instance, on its side.

From the open position, the fuel door 700 is rotated to the closed position. This action applies force to the actuation linkage (fuel door button 724 and pressure actuator 725) and thus seals valve seat 729. While the fuel door 700 is maintained in the closed position, the pressure control valve 718 seals the fuel tank 704 unless the internal pressure reaches the valve's set point, at which time the pressure control valve 718 opens and allows air/fuel vapor to exit the fuel tank 704 through the vent 740. If the pressure inside the fuel tank 704 drops below atmospheric pressure by a predetermined amount, the vacuum valve within the pressure control valve 718 allows air/fuel vapor to reenter the fuel tank 740 through the vent 740 (e.g., from atmosphere or carbon canister). From the closed position, the fuel door 700 must be moved (e.g., rotated) to the open position if the operator wishes to access the fuel tank interior for refilling. This action removes the force on the actuation linkage (fuel door button 724 and pressure actuator 725) and unseals valve seat 729. In this position, the pressure inside the fuel tank 704 is free to equalize with the pressure outside the fuel tank 704 through the vent 740. The pressure equalization can be completed before the operator removes the fuel cap from the top plate. Thus, the unsealing and removal of the fuel cap from the opening in the top plate 708 does not play any part in venting the fuel tank 704.

The vent arrangement of FIGS. 8 and 9 is configured to provide two options for venting the fuel tank 704, both of which are integrated into the top plate 708. The first vent (pressure control valve 718) is operable to vent in response to set point pressures, both positive and negative, within the fuel tank 704. The second vent (rollover/pressure release valve 720) vents the fuel tank 704 regardless of the magnitude of pressure difference from barometric pressure, but is only operable in response to the fuel door 700 being opened.

Figure 10:
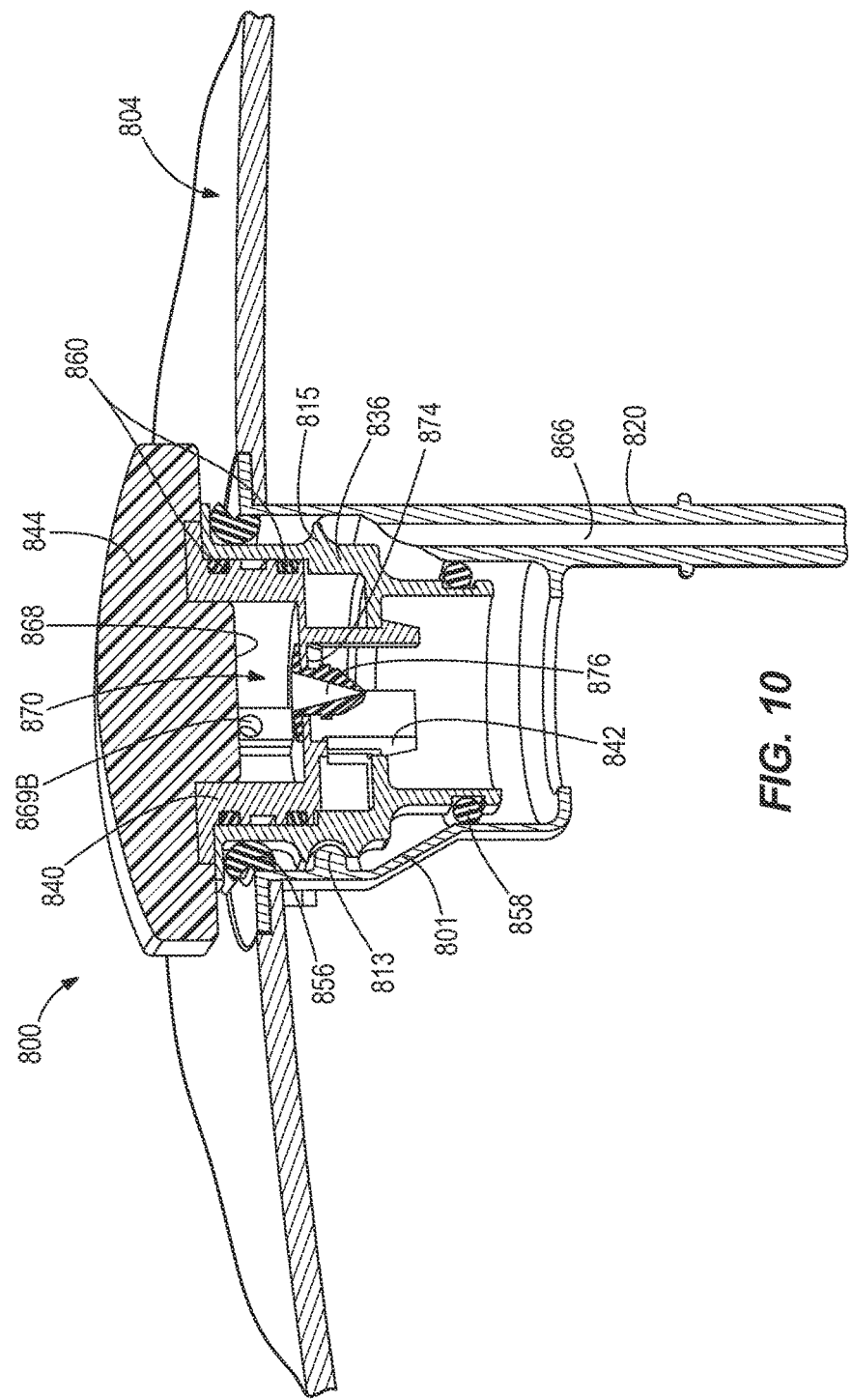
FIG. 10 is a cross-section view of a fuel tank assembly according to another embodiment having a pressure release cap of another construction, having a lost motion drive.
Figure 11:
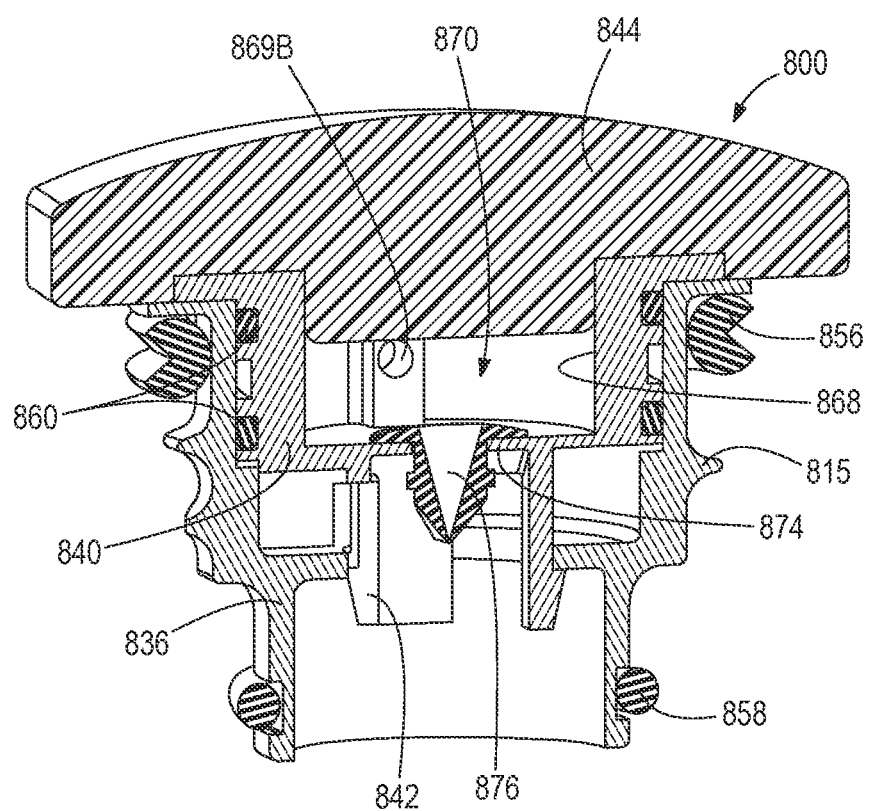
FIG. 11 is a cross-section view of the pressure release cap of FIG. 10.
Figure 12:
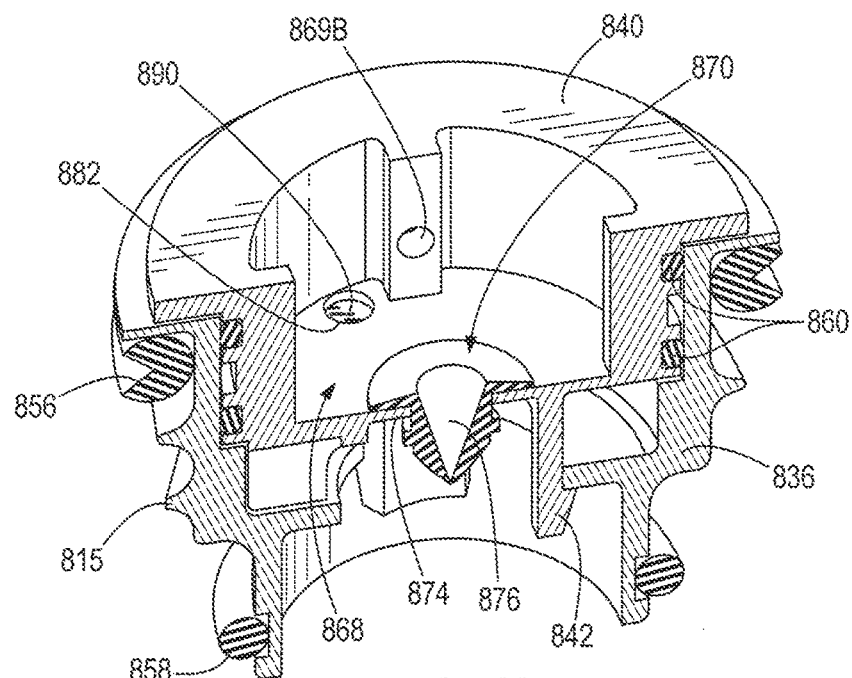
FIG. 12 is a cross-section view of inner and outer housings of the pressure release cap of FIG. 11.
Figure 16:
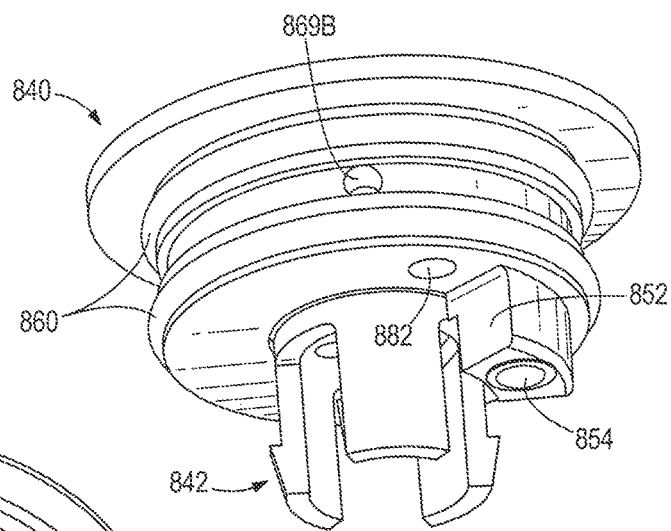
FIG. 16 is a perspective view of the inner housing of FIG. 15.

FIGS. 10-18 illustrate a fuel tank assembly according to another construction, the fuel tank assembly including a fuel tank 804 and a fuel cap 800. The arrangement provides automatic pressure release, protection against liquid fuel release should the vehicle be upended (roll over protection), and controlled release of pressure prior to removal of the fuel cap 800 for vehicle refueling or other reasons. The fuel cap 800 is removably engageable with a fuel inlet or filler cup 801 that is secured to an opening in the fuel tank 804. The bottom or interior end of the filler cup 801 is open to provide access to the tank interior. In the illustrated construction, the filler cup 801 is provided with female threads 813 and an outer body portion 836 of the fuel cap 800 is provided with male threads 815 complementary with the female threads 813. When the fuel cap 800 is coupled to the filler cup 801 in a fully closed position as shown in FIG. 10, an upper seal 856 and a lower seal 858 provided on the outer body portion 836 can establish fluid sealing between the fuel cap 800 and the filler cup 801 on both sides of the threaded connection. An inner body portion 840 of the fuel cap 800 is coupled to the outer body portion 836 in a manner, as described in further detail below, which allows a rotational drive force for installing and removing the fuel cap 800, but also provides a lost motion connection, which is utilized for selectively venting the fuel tank 804. Barbed legs 842 or another type of connection allow the outer and inner body portions 836, 840 to be snapped together and prevent relative axial movement while allowing relative rotation. Two axially-spaced seals 860 are provided on the inner body portion 840 to establish fluid sealing between an interior of the outer body portion 836 and an exterior of the inner body portion 840. A cover 844 is secured to the inner body portion 840, and may be secured against relative rotation so that user force is transmitted directly to the inner body portion 840. Rotational drive for installing or uninstalling the fuel cap 800 is only provided from the inner body portion 840 to the outer body portion 836 by contact between respective drive dogs or lugs 850, 852. The drive lugs 850, 852 can each be wedge- or pie-shaped and can have arcuate lengths that provide a lost motion relative rotation of a predetermined angle less than 360 degrees. In some constructions, the lost motion rotation can be about 270 degrees, but the drive lugs 850, 852 can be configured to provide more or less. A detent 854 can be provided to positively position the outer and inner body portions 836, 840 relative to each other and/or provide tactile feedback to the user. As shown in FIG. 16, the detent 854 can be provided on a bottom surface of the drive lug 852. Although not shown, one or more corresponding features (e.g., notches, depressions, apertures) can be provided on the outer body portion 836, on a bottom transverse wall 862 for example, to engage with the detent 854.

A fitting 820 for venting can be formed integrally with the filler cup 801 to provide a vent channel 866 which is open to an interior of the outer body portion 836 between the seals 860. The vent channel 866 may be fluidly coupled to a device such as a carbon canister (not shown) for trapping fuel vapor to reduce evaporative emissions. In other configurations or constructions, the vent channel 866 can direct fuel vapor into the vehicle engine or to the atmosphere. The remote venting location connected to the vent passage 866 is provided in constant fluid communication with a chamber 868 provided inside the inner body portion 840 defined in part by the cover 844. The vent channel 866 is fluidly coupled to the chamber 868 via apertures 869A, 869B formed in the respective sidewalls of the outer and inner body portions 836, 840.

A valve assembly 870 is provided within the inner body portion 840 to control the inward and/or outward pressure venting of the interior of the fuel tank 804. The valve assembly 870 includes a valve body 874. The valve body 874 may include one or more apertures and may support one or more valve members 876 operable to seal in one pressure direction and selectively open in the opposite pressure direction, at a predetermined pressure differential. The valve member(s) 876 can take any number of physical forms including, but not limited to, umbrella valves, duckbill valves, combination umbrella/duckbill valves, and spring valves. Although shown as a single, two-way valve member 876, other constructions may employ a single, one-way valve or may include two separate one-way valves. The valving within the valve body 874 can provide venting of excess pressure (of air and/or fuel vapor) above a predetermined internal pressure (e.g., 2.5 psig) from the fuel tank 804 to the vent channel 866 and can also provide for make-up air to enter the fuel tank 804 when vacuum above a predetermined level (e.g., 0.5 psig) is present in the fuel tank 804. The make-up air may include fuel vapor from the carbon canister. The valving within the valve body 874 operates to mitigate pressure or vacuum build-up in the fuel tank 804 at all times while the fuel cap 800 is sealed to the filler cup 801. For example, excess pressure is relieved during periods of warming within the fuel tank 804 (with the engine running or stopped) and excess vacuum pressure is relieved during periods of cooling within the fuel tank 804. The valving arrangement will facilitate a temporary venting passage upon reaching either of the set pressures (positive or negative) and will close the venting passage upon the pressure differential decreasing to a closing pressure, which may be nearly equal to the given set pressure. However, there is an additional function for venting the fuel tank 804 immediately prior to removal of the fuel cap 800 from the filler cup 801, regardless of the operational state(s) of the valving within the valve body 874.

Figure 13:
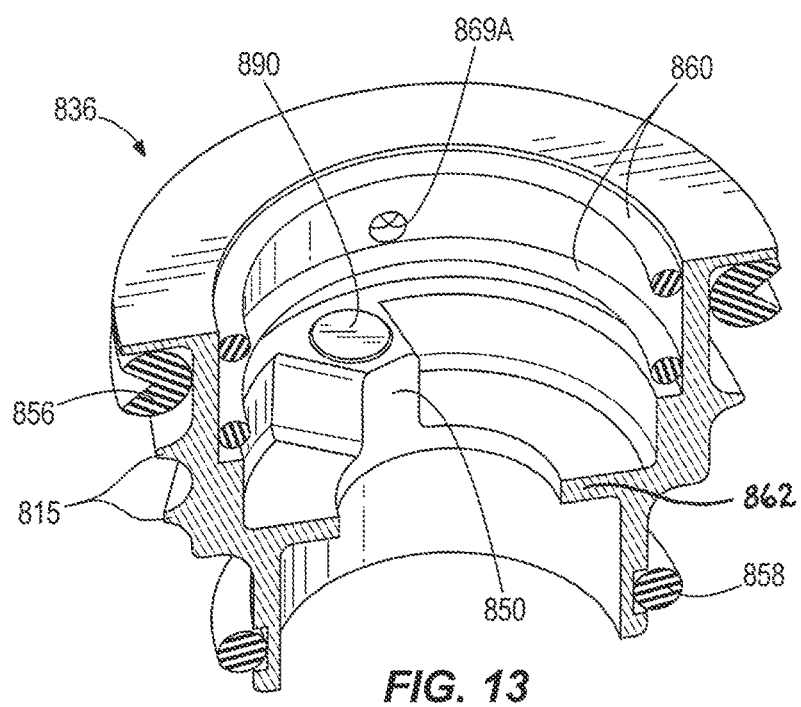
FIG. 13 is a cross-section view of the outer housing of FIG. 12.
Figure 14:
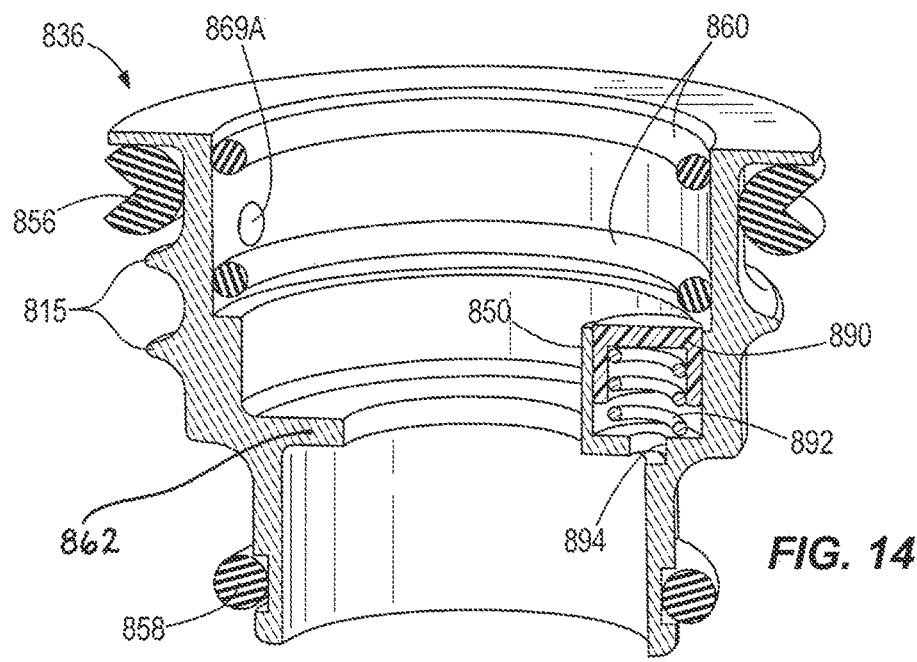
FIG. 14 is another cross-section view of the outer housing of FIGS. 12 and 13.
Figure 15:
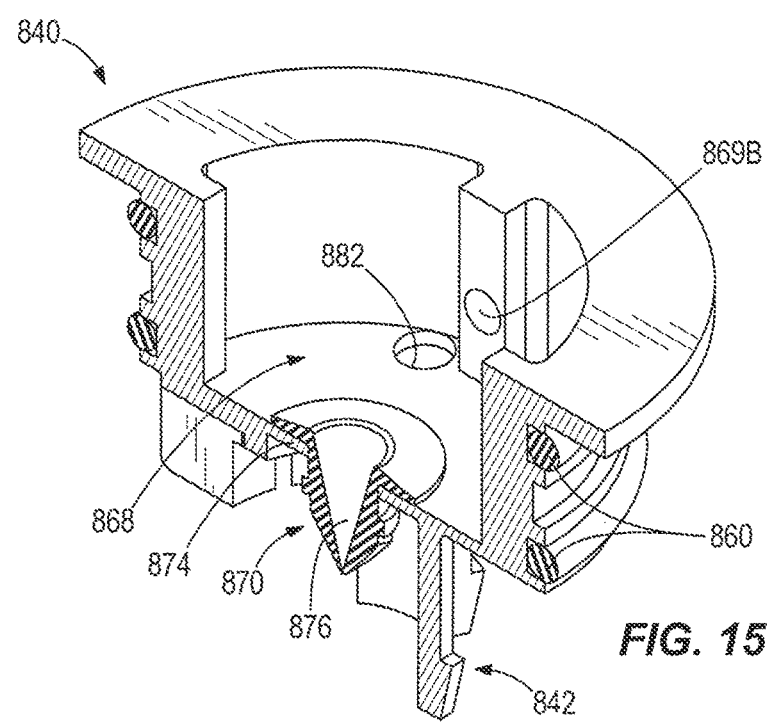
FIG. 15 is a cross-section view of the inner housing of FIG. 12.
Figure 17:
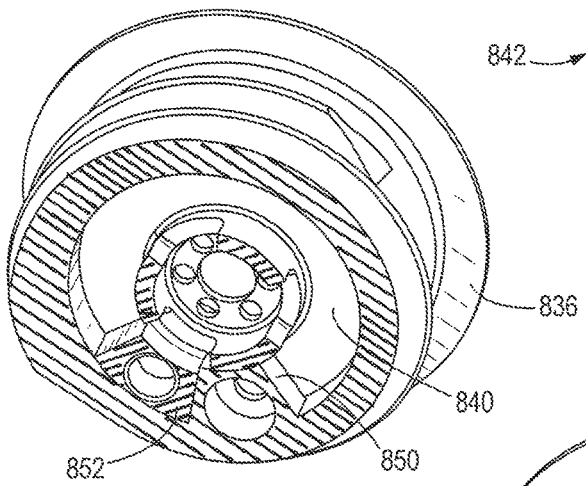
FIG. 17 is a cross-section view of the inner and outer housings of FIG. 12, with the inner housing rotated to a first extent relative to the outer housing.
Figure 18:
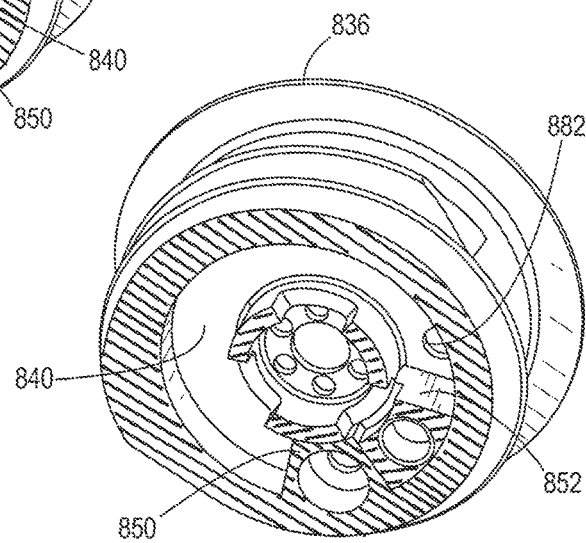
FIG. 18 is a cross-section view of the inner and outer housings of FIG. 12, with the inner housing rotated to a second extent relative to the outer housing.

At a bottom or interior wall of the inner body portion 840 that forms the chamber 868, an aperture 882 is provided for selectively establishing fluid communication between the chamber 868 and the fuel tank 804. The aperture 882 is selectively closed by a seal member 890 provided on the outer body portion 836, though the locations of aperture 882 and the seal member 890 can be reversed. The seal member 890 slides or moves along an axial face in which the aperture 882 is formed to selectively form an axial face seal with the aperture 882 to prevent fluid communication. The seal member 890 can be provided on and/or in the drive lug 850 as shown in FIG. 13. The seal member 890 can be biased by a spring 892 or other biasing member toward the inner body portion 840 so that it is pressed tightly against the aperture 882 with a predetermined force when overlapping the aperture 882. The seal member 890 overlaps the aperture 882 to close the aperture 882 when the inner body portion 840 is rotated fully in a cap installing direction relative to the outer body portion 836 (FIG. 17). Buildup of positive pressure within the fuel tank 804 adds to the sealing force of the seal member 890 as this pressure is incident on a back side of the seal member 890 through a vent aperture 894 provided in a transverse wall 862 of the outer body portion 836 (FIG. 14).

Thus, when the fuel cap 800 is fully closed, or in a first configuration, the seal member 890 bears against the aperture 882 to keep it closed so that fluid communication through the apertures 882, 894 is blocked between the fuel tank 804 and the vent channel 866. Pressure/vacuum equalization then only takes place through the valve assembly 870. However, when the inner body portion 840 is rotated in the cap removal direction to move the drive lug 852 away from the drive lug 850, the aperture 882 is moved off of the seal member 890 to break the seal and open the aperture 882, placing the fuel cap 800 in a second configuration. In this position, fluid communication is established between the fuel tank 804 and the chamber 868 through the apertures 882, 894, and from the chamber 868 to the vent channel 866 via the apertures 869A, 869B. Thus, at the time that the operator begins to rotate the inner body portion 840 (via the cover 844) in the uninstalling direction, a vent passage that bypasses the normal passage through the valve assembly 870 is established for venting positive or vacuum pressure within the tank 804, regardless of the magnitude of the pressure. In other words, the fuel cap 800 is operable to vent the fuel tank 804 in response to the fuel cap 800 being moved away from the fully closed position in the uninstalling direction prior to drive force being transmitted to the outer body portion 836 (e.g., from either of the inner body portion 840 or the cover 844). Forced venting responsive to the initial, lost-motion travel of the inner body portion 840 and cap cover 844 ensures that the fuel tank 804 is always vented immediately prior to removal of the fuel cap 800, which limits unregulated pressure equalization through the tank opening when the fuel cap 800 is unscrewed.

Although the invention has been described in detail with reference to certain preferred embodiments, variations and modifications exist within the scope and spirit of one or more independent aspects of the invention as described.

The invention claimed is:

1. A fuel tank assembly comprising:
   a fuel tank including a fuel inlet, the fuel inlet providing access to an interior of the fuel tank;
   a fuel cap threadably engageable with the fuel inlet to selectively close the fuel inlet, the fuel cap having a grip portion provided for manipulation by a user;
   a vent channel; and
   a vent path between the vent channel and the interior of the fuel tank, wherein, in a first configuration of the fuel tank assembly the fuel cap is fully threaded to the fuel inlet to a fully closed position,
   wherein the fuel tank assembly is operable to transition to a second configuration in which the vent path is unobstructed regardless of the pressure inside the fuel tank and the fuel cap is fully threaded to the fuel inlet to the fully closed position,
   wherein, to enable unthreading of the fuel cap from the fuel inlet, the fuel tank assembly is operable to transition from the first configuration to the second configuration in response to opening of a fuel door to uncover the grip portion, the fuel door separate from the fuel cap and movable between a closed position covering the grip portion to prevent removal of the fuel cap from the fuel inlet, and an open position in which the grip portion is uncovered to enable removal of the fuel cap from the fuel inlet, and
   wherein a pressure release valve is operable by movement of the fuel door to the open position to establish the vent path and transition the fuel tank assembly from the first configuration to the second configuration.

2. The fuel tank assembly of claim 1, wherein the first configuration is a continuous fuel storage configuration in which unthreading of the fuel cap is not enabled.

3. The fuel tank assembly of claim 1, wherein the vent path between the vent channel and the interior of the fuel tank is a first vent path, the fuel tank assembly further comprising:
   a normally closed pressure control valve operable to transition from a closed position to an open position to provide a second vent path between the vent channel and the interior of the fuel tank,
   wherein, when the fuel tank assembly is in the first configuration, the normally closed pressure control valve is operable to open in response to a pressure differential outside of a predetermined range.

4. The fuel tank assembly of claim 1, further comprising a top plate located between the fuel door and the fuel tank and configured to support the pressure release valve and a pressure actuator through which a closing force is transmitted to the pressure release valve when the fuel door is in the closed position.

5. The fuel tank assembly of claim 4, wherein the vent path between the vent channel and the interior of the fuel tank is a first vent path, the fuel tank assembly further comprising:
   a normally closed pressure control valve supported by the top plate and operable to transition from a closed position to an open position to provide a second vent path between the vent channel and the interior of the fuel tank,
   wherein, when the fuel tank assembly is in the first configuration, the normally closed pressure control valve is operable to open in response to a pressure differential outside of a predetermined pressure range.

6. A fuel tank assembly comprising:
   a fuel tank including a fuel inlet, the fuel inlet providing access to an interior of the fuel tank;
   a fuel cap threadably engageable with the fuel inlet to selectively close the fuel inlet, the fuel cap having a grip portion provided for manipulation by a user;
   a vent channel; and
   a vent path between the vent channel and the interior of the fuel tank, wherein, in a first configuration of the fuel tank assembly the fuel cap is fully threaded to the fuel inlet to a fully closed position,
   wherein the fuel tank assembly is operable to transition to a second configuration in which the vent path is unobstructed regardless of the pressure inside the fuel tank and the fuel cap is fully threaded to the fuel inlet to the fully closed position,
   wherein, to enable unthreading of the fuel cap from the fuel inlet, the fuel tank assembly is operable to transition from the first configuration to the second configuration in response to a movement of the grip portion that does not alter the threaded engagement with the fuel inlet,
   wherein the fuel cap further comprises:
      a body portion engageable with the fuel inlet;
      a movable portion including the grip portion, the movable portion coupled to the body portion and movable relative to the body portion between a retracted position in which the grip portion is stowed to inhibit manipulation and an extended position in which the grip portion is presented for manipulation; and
      a valve assembly, wherein, in the first configuration, the movable portion is in the retracted position, and the valve assembly obstructs the vent path, and wherein, in the second configuration, the movable portion is in the extended position.

7. The fuel tank assembly of claim 6, wherein the valve assembly is located within the body portion and suspended between an upper spring and a lower spring.

8. The fuel tank assembly of claim 6, wherein the vent path between the vent channel and the interior of the fuel tank is a first vent path, the fuel tank assembly further comprising:
a normally closed pressure control valve operable to transition from a closed position to an open position to provide a second vent path between the vent channel and the interior of the fuel tank,
wherein, when the fuel tank assembly is in the first configuration, the normally closed pressure control valve is operable to open in response to a pressure differential outside of a predetermined range.

9. The fuel tank assembly of claim 6, wherein the body portion is generally tubular in shape and includes an inner cylindrical surface, an outer cylindrical surface, and a bottom wall.

10. The fuel tank assembly of claim 9, further comprising:
a first seal located between the valve assembly and the inner cylindrical surface of the body portion above the vent channel; and
a second seal located between the valve assembly and the bottom wall below the vent channel, the second seal being selectively established when the movable portion is in the retracted position.

11. The fuel tank assembly of claim 10, wherein the vent path between the vent channel and the interior of the fuel tank is a first vent path, the fuel tank assembly further comprising:
a normally closed pressure control valve supported by the valve assembly and operable to transition from a closed position to an open position to provide fluid communication between the fuel tank and the vent channel when the normally closed pressure control valve experiences a pressure differential between the interior of the fuel tank and the vent channel outside of a predetermined range; and
an aperture in the valve assembly, separate from the normally closed pressure control valve, located between the first seal and the second seal,
wherein, when the movable portion is in the retracted position, the aperture is aligned with the vent channel.

12. The fuel tank assembly of claim 6, wherein the vent path between the vent channel and the interior of the fuel tank is a first vent path, the fuel tank assembly further comprising:
a normally closed pressure control valve operable to transition from a closed position to an open position to provide a second vent path between the vent channel and the interior of the fuel tank,
wherein, when the fuel tank assembly is in the first configuration, the normally closed pressure control valve is operable to open in response to a pressure differential outside of a predetermined range.

13. A fuel tank assembly comprising:
a fuel tank including a fuel inlet, the fuel inlet providing access to an interior of the fuel tank;
a fuel cap threadably engageable with the fuel inlet to selectively close the fuel inlet, the fuel cap having a first body portion with threads engageable with the fuel inlet, the fuel cap further having a second body portion defining a grip portion provided for manipulation by a user, the second body portion being rotatable relative to the first body portion through a limited rotational range by exterior manipulation of the grip portion;
a vent channel; and
a vent path between the vent channel and the interior of the fuel tank, wherein, in a first configuration of the fuel tank assembly the fuel cap is fully threaded to the fuel inlet to a fully closed position,
wherein the fuel tank assembly is operable to transition to a second configuration in which the vent path is unobstructed regardless of the pressure inside the fuel tank and the fuel cap is fully threaded to the fuel inlet to the fully closed position,
wherein, to enable unthreading of the fuel cap from the fuel inlet, the fuel tank assembly is operable to transition from the first configuration to the second configuration, without altering the threaded engagement with the fuel inlet, in response to rotation of the second body portion relative to the first body portion from a blocking position in which the vent path is blocked to a venting position to establish the vent path,
wherein the first body portion is operable to be driven by the second body portion to rotate in an opening direction for unthreading the fuel cap from the fuel inlet only when the second body portion is in the venting position, and
wherein the vent path between the vent channel and the interior of the fuel tank is a first vent path, the second body portion of the fuel tank assembly further including a normally closed pressure control valve operable to transition from a closed position to an open position to provide a second vent path between the vent channel and the interior of the fuel tank, wherein, when the fuel tank assembly is in the first configuration, the normally closed pressure control valve is operable to open in response to a pressure differential outside of a predetermined pressure range.

14. The fuel tank assembly of claim 13, wherein the limited rotational range of the second body portion relative to the first body portion is less than 360 degrees.

15. A fuel tank assembly comprising:
a fuel tank including a fuel inlet, the fuel inlet providing access to an interior of the fuel tank;
a fuel cap threadably engageable with the fuel inlet to selectively close the fuel inlet, the fuel cap having a first body portion with threads engageable with the fuel inlet, the fuel cap further having a second body portion defining a grip portion provided for manipulation by a user, the second body portion being rotatable relative to the first body portion through a limited rotational range by exterior manipulation of the grip portion;
a vent channel; and
a vent path between the vent channel and the interior of the fuel tank, wherein, in a first configuration of the fuel tank assembly the fuel cap is fully threaded to the fuel inlet to a fully closed position,
wherein the fuel tank assembly is operable to transition to a second configuration in which the vent path is unobstructed regardless of the pressure inside the fuel tank and the fuel cap is fully threaded to the fuel inlet to the fully closed position,
wherein, to enable unthreading of the fuel cap from the fuel inlet, the fuel tank assembly is operable to transition from the first configuration to the second configuration, without altering the threaded engagement with the fuel inlet, in response to rotation of the second body portion relative to the first body portion from a blocking position in which the vent path is blocked to a venting position to establish the vent path, wherein the first body portion is operable to be driven by the second body portion to rotate in an opening direction for unthreading the fuel cap from the fuel inlet only when the second body portion is in the venting position, and wherein the second body portion includes one of an aperture and a seal member, and the first body portion includes the other of the aperture and the seal member, and wherein when the second body portion is in the blocking position, the aperture is closed by the seal member.

16. The fuel tank assembly of claim 15, wherein the vent path extends through the aperture when the second body portion is in the venting position.

17. The fuel tank assembly of claim 15, further comprising a biasing member urging the seal member in a closing direction.

* * * * *